UNITED STATES PATENT OFFICE.

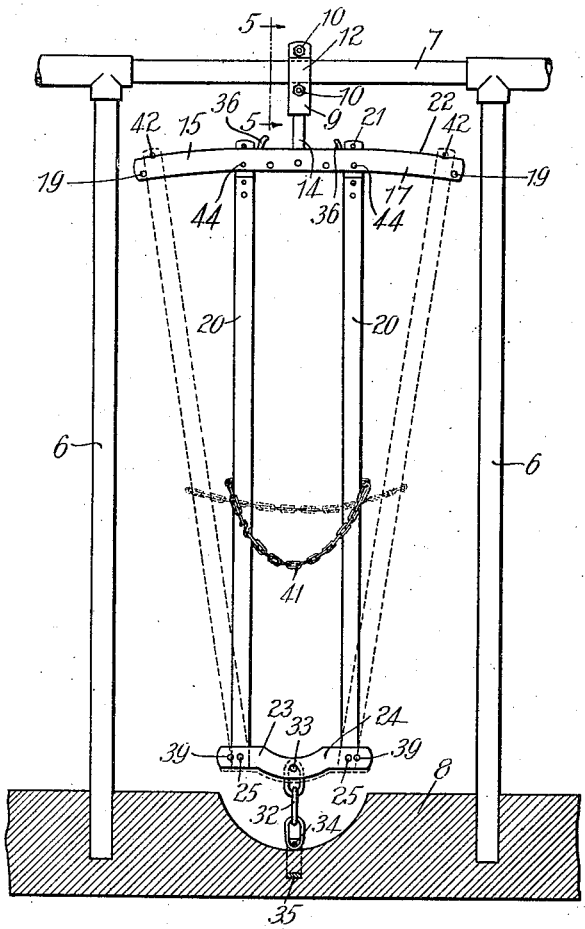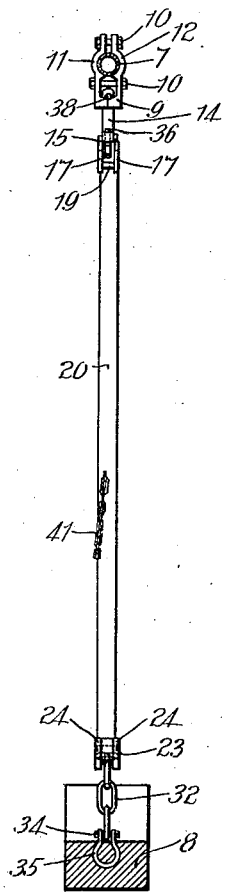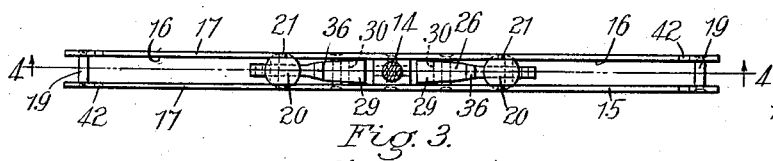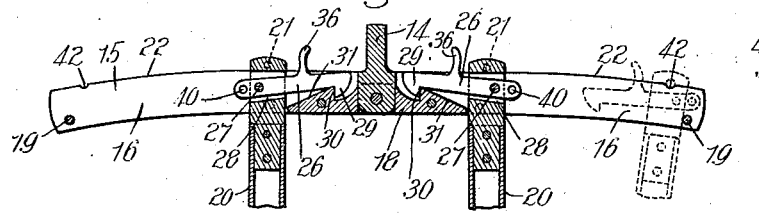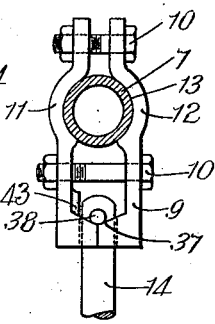

ALFRED J. BUTLER, OF CHARLESTOWN, MASSACHUSETTS.

STANCHION.

1,052,458.  Specification of Letters Patent.  Patented Feb. 11, 1913.

Application filed March 16, 1912. Serial No. 684,083.

*To all whom it may concern:*

Be it known that I, ALFRED J. BUTLER, a citizen of the United States, residing at Charlestown, in the county of Suffolk and State of Massachusetts, have invented new and useful Improvements in Stanchions, of which the following is a specification.

This invention relates to improvements in cattle stanchions and has for its object to provide a stanchion which is adapted to be opened to such an extent that there will be no difficulty experienced in getting the cattle to put their heads into the right places on entering the stall, and which eliminates the necessity of using an extra or swinging post as is sometimes employed between the bars of the stanchion and the stall partitions, thereby reducing the cost of the device as well as permitting the cattle to turn their heads freely while held therein, for the purpose of licking themselves.

Another object of the invention is to provide a stanchion which is adapted to be swung freely about a vertical axis, but which will be automatically returned to its correct receiving position.

The invention consists in the combination and arrangement of parts, whereby the above objects and other objects hereinafter appearing are attained, as set forth in the following specification and particularly pointed out in the claims.

Referring to the drawings: Figure 1 is a front view of a stanchion embodying my invention with the curb of the stall shown in section and the supporting frame for said stanchion broken away to save space in the drawing. Fig. 2 is a side view of the stanchion illustrated in Fig. 1 with the supporting frame therefor shown in section. Fig. 3 is a plan view of said stanchion with its supporting stud shown in section. Fig. 4 is a sectional elevation taken on line 4—4 of Fig. 3. Fig. 5 is a sectional elevation taken on line 5—5 of Fig. 1.

Like numerals refer to like parts throughout the several views of the drawings.

In the drawings, 6 represents the uprights and 7 the cross pieces constituting a stanchion supporting frame, preferably formed of tubing, the lower ends of the uprights thereof being embedded in a concrete curb 8. A support 9, preferably formed in two parts 11 and 12, is secured upon the cross piece 7 by bolts 10 which engage said parts 11 and 12 and clamp said cross piece 7 within the recesses 13 formed in the opposite sides of said support and clearly illustrated in Fig. 5. A pivot 14 is journaled in said support, said pivot having secured at the lower end thereof a head piece 15 which, by means of said pivot, is adapted to be rotated in a substantially horizontal plane for the purpose hereinafter more fully set forth. Said head piece preferably embodies in its construction slots 16 vertically disposed one upon each side of the pivot 14 and formed by a pair of coextensive parallelly disposed members 17 and a separator 18 by means of which said parallelly disposed members are maintained at a desired distance apart, and upon which the pivot 14 is secured. The outer ends of said parallelly disposed members are connected by studs 19 which constitute the outer ends of said slots 16. Side bars 20 are suspended from said head piece between said parallelly disposed members and are provided with lugs 21 which engage the upper edges 22 of the members 17 whereby said side bars are sustained within the slots 16. A spreader 23 connects the lower ends of said side bars 20 and preferably embodies in its construction parallelly disposed coextensive plates 24 between which said side bars are disposed. Pins 25 connect said plates together at opposite ends thereof and constitute pivots upon which the side bars 20 are adapted to be rocked, the upper ends thereof moving laterally relatively to each other within the slots 16 from the positions illustrating said side bars in full lines, see Fig. 1, to those shown in dotted lines in said figure, said movements being limited by the separator 18 in one direction and the studs 19 in the other direction. Means are provided to detachably secure said bars 20 in upright parallel relation one to the other, said means preferably consisting of latches 26 pivotally mounted upon pins 27 within slots 28 located at the upper ends of said side bars. Each of said latches is provided with a tooth 29 which engages a corresponding tooth 30 formed on said separator 18, and as said side bars 20 are moved from their outer or open positions into their closed positions, their latches 26, one of which is shown at the right of Fig. 4 in dotted lines, in its outermost position, ride upwardly on the inclines 31 and the teeth 29 thereon engage the teeth 30 on said separator, the toothed ends of said latches 26 being heavy enough to cause them to drop into place.

It is essential in a stanchion of this character that the spreader 23 be firmly anchored as otherwise undue strain will be brought to bear upon the pivot 14. It is also important that said anchoring means should be flexible in order to permit said stanchion to be rotated about the longitudinal axial line of said pivot 14 for at least 80° and occasionally more. For this purpose I preferably employ a series of links 32, the uppermost of which engages a pin 33 between the parts 24 of said spreader. The lowermost link in said series of links is connected by means of a bolt 34 to a U-shaped piece 35 which is embedded at its closed end in the cement curb 8.

When it is desired to open said stanchion or in other words move the side bars 20 from their upright positions to their inclined positions in readiness to receive the cattle, the latches 26 are rocked by means of their finger pieces 36 thus disengaging the teeth 29 from the teeth 30.

In a device of this character it is extremely important that the normal position of the swinging stanchion be maintained as soon as the cattle are released therefrom, in order that said cattle in returning thereto may be directed into the right place, for if said stanchion were turned at right angles to that shown in Fig. 1 with the longitudinal median line of the head piece 15 extending transversely of the longitudinal median line of the cross piece 7 the cattle would be directed through the opening on either side of said stanchion between the uprights 6. To prevent such an occurrence, I have provided in the support 9 a synclinal groove 37 which extends transversely of said support preferably parallel with the longitudinal median axial line of the cross piece 7, the line of intersection between the inclined surfaces constituting said synclinal groove intersecting the median axial line of the stud 14. Lateral projections 38 on the stud 14 normally repose within said groove and as said stud is rotated relatively to said support, said projections ride upwardly upon opposite sides respectively of said groove until stopped by one of the projections 38 engaging the lug 43. As the pressure tending to rotate the stud 14 is removed, the incline of the sides of said groove is sufficient to cause said projections to return to their normal positions at the bottom thereof in which position said projections are retained owing to the weight of the stanchion which is sustained thereby.

It is often necessary to change the relation between the side bars 20 in order to accommodate different cattle. To accomplish this, I have provided in the spreader 23 a second series of holes 39 in which the pivots 25 may be placed, while in the latches 26 are holes 40 adapted to receive the pins 27 thus permitting the opposite ends of the side bars 20 to be kept at an equal distance apart when said stanchion is closed, and pins are placed in the holes 44 which prevent said bars 20 from moving laterally toward each other. A chain 41 is provided which is adapted to be hooked across between the side bars 20 and prevents the cattle from stepping through the opening between said bars while the same are separated.

As hereinbefore stated the weight of the bars 20 and the spreader 23 is sustained by the lugs 21 upon the upper edges 22 of the parallelly disposed members 17 and in order that the relation between the spreader 23 and said head piece may remain unchanged during the swinging movements of the said bars 20 upon their pivots 25, said head piece is arcuated, or in other words, portions of the edges 22 of said head piece are concentric with the pivot 25 of the side bar contacting therewith. It is also a common occurrence for the cattle to hit said side bars and close them before their heads have been placed therebetween and to guard against this accidental displacement, I have provided depressions 42 which may be of any suitable shape to receive the lugs 21 upon the side bars 20 when said bars rest against the stops 19 the weight of said bars and said spreader being sufficient to hold the same therewithin.

Having thus described my invention what I claim and desire by Letters Patent to secure is:

1. A device of the class described having, in combination, a support provided with a synclinal groove, a head piece, a stud extending upwardly from said head piece into pivotal engagement with said support and intersecting said groove, oppositely disposed lateral projections on said stud normally reposing within said groove, means engaged by said projections adapted to limit the movement of said stud in said support, side bars suspended from said head piece, adapted to be moved at their upper ends laterally relatively to each other, a spreader connecting the lower ends of said side bars, and flexible anchoring means for said spreader.

2. A device of the class described having, in combination, a supporting frame embodying in its construction a cross piece, a two-part support clamped upon said cross piece, said support having an opening extending transversely thereof, the bottom wall constituting said opening forming a synclinal groove, said support also having a hole therein extending transversely of and intersecting said synclinal groove, a head piece, a stud on said head piece pivotally arranged in said hole, lateral projections on said stud located in said groove, side bars suspended from said head piece, and anchoring means for the lower ends of said bars.

3. A device of the class described having, in combination, a supporting frame embodying in its construction a cross piece, a two-part support clamped upon said cross piece, said support having an opening extending transversely thereof, the bottom wall constituting said opening forming a synclinal groove, said support also having a hole therein extending transversely of and intersecting said synclinal groove, a head piece, a stud on said head piece pivotally arranged in said hole, lateral projections on said stud located in said groove, means on said support adapted to be engaged by said lateral projections to limit the rotary movement of said stud within said support, side bars suspended from said head piece, and anchoring means for the lower ends of said bars.

In testimony whereof I have hereunto set my hand in presence of two subscribing witnesses.

ALFRED J. BUTLER.

Witnesses:
 CHARLES S. GOODING,
 SYDNEY E. TAFT.

Copies of this patent may be obtained for five cents each, by addressing the "Commissioner of Patents, Washington, D. C."